Dec. 12, 1961  W. C. RIESTER ET AL  3,012,266
WINDSHIELD CLEANER
Filed March 26, 1958
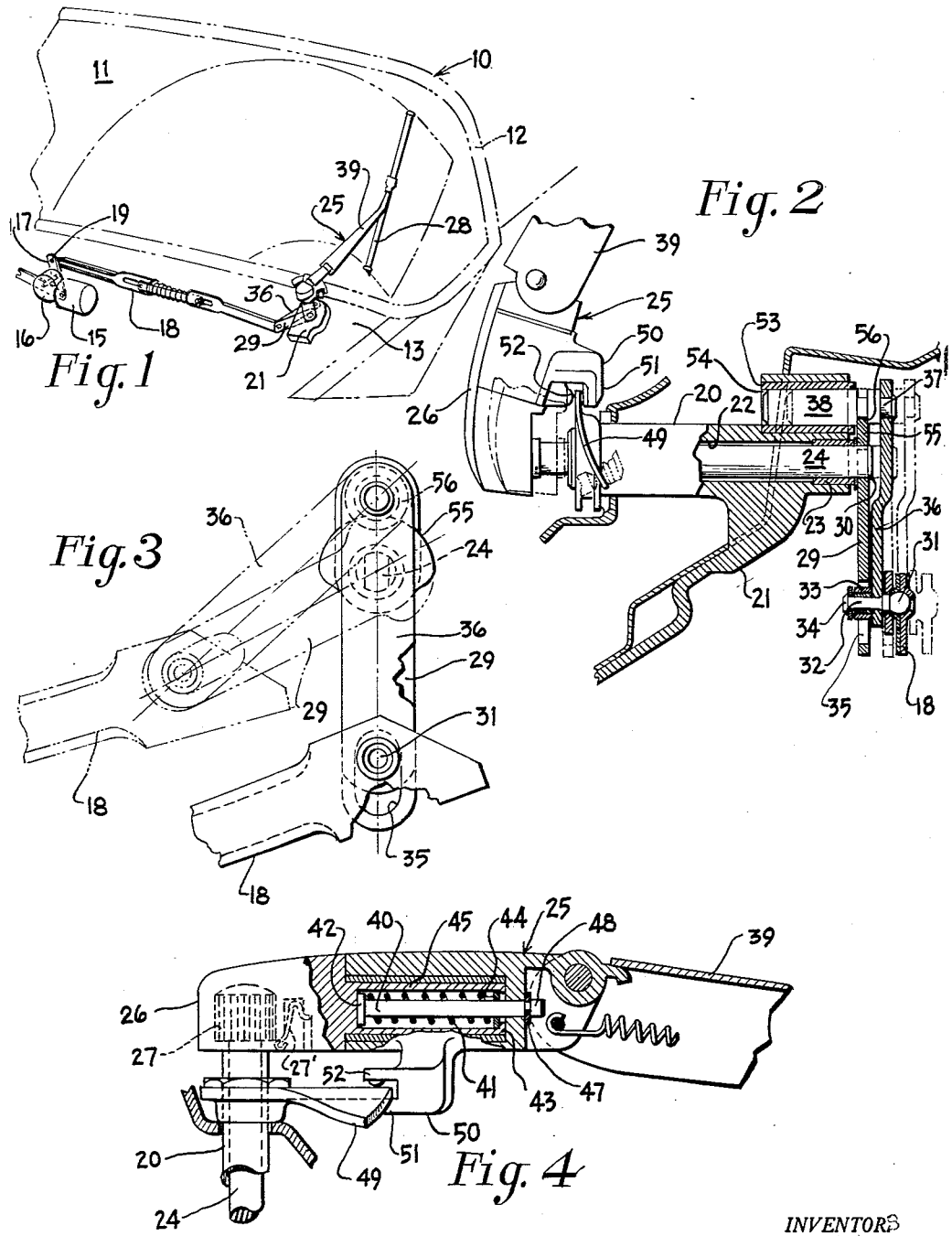
INVENTORS
WILLIAM C. RIESTER and
BY RAYMOND D. PAGE
Bean Brooks Buckley & Bean
ATTORNEYS

United States Patent Office 3,012,266
Patented Dec. 12, 1961

3,012,266
WINDSHIELD CLEANER
William C. Riester, Williamsville, and Raymond D. Page, Eggertsville, N.Y., assignors to Trico Products Corporation, Buffalo, N.Y.
Filed Mar. 26, 1958, Ser. No. 724,148
9 Claims. (Cl. 15—250.21)

This invention relates to a windshield wiping assembly and more particularly to an improved driving linkage for a wiper which is adapted to travel through a wide arc which includes a portion of a windshield having an extreme curvature.

The present invention is concerned with windshield wipers which are required to wipe windshields having portions of extreme curvature such as found in "wrap-around" type of windshields and which are required to sweep an extremely wide arc which may approach 180°. In wiping around an extremely curved windshield, the angle of the arm which supports the blade must be changed to maintain the wiper blade substantially normal to the windshield to maintain the efficiency of the blade and to prevent the metal on which the blade is mounted from scoring the glass. In order to obtain sufficient torque at the ends of the wide-arc wiper stroke, a torque-transmitting multiple linkage is required. However, when the wiper arm which mounts the wiper has its angle changed to maintain the blade substantially normal to the windshield, an end thrust is inherently applied to the rockshaft on which the wiper arm is mounted. It is therefore desirable to permit the rockshaft to reciprocate to accommodate the end thrust in order to prevent objectionable binding. When this reciprocation is permitted the above mentioned torque-transmitting multiple linkage is, itself, in danger of binding, with the possible attendant result that the entire linkage may lock or break. Therefore, an additional mechanical arrangement must be utilized to prevent binding of the torque-transmitting multiple linkage. However, such a mechanical arrangement will usually produce an inherent amount of lost motion which results in an objectionable slapping noise during wiper operation. It is with the producing of a wiper assembly which will operate efficiently with a minimum of binding and lost motion that the present invention is concerned.

It is accordingly the object of the present invention to provide a simple and efficient windshield wiper drive linkage for providing a wide arc of travel to a windshield wiper which is adapted to be used on a windshield having portions of extreme curvature, the linkage not only eliminating the possibility of the binding of various components thereof but also having a minimum amount of lost motion therein. Other objects and attendant advantages of the present invention will readily be perceived hereafter and the present invention will be more fully understood when the following portions of the specifications are read in conjunction with the accompanying drawings wherein:

FIG. 1 is a fragmentary perspective view of a windshield wiper linkage on an automobile;

FIG. 2 is a fragmentary view, partly in cross section, of the improved linkage of the present invention;

FIG. 3 is a fragmentary view of the linkage which is adapted to transmit motion from a driving source to a rockshaft of a windshield wiper to cause the wiper to travel through a relatively wide arc; and FIG. 4 is a fragmentary perspective view, partly in cross section, of a windshield wiper arm which is adapted to be used with a windshield having portions of extreme curvature.

In FIG. 1 numeral 10 depicts an automotive vehicle having a windshield 11 mounted within molding 12 which, in turn, has the lower portion thereof mounted proximate the cowl 13 of the vehicle. A suitable driving source such as electric motor 15 is suitably attached to the firewall (not shown) or to the underside of the instrument panel (not shown). A gearing arrangement 16 is suitably coupled to motor 15 for rotating crankarm 17 in the well known manner. A driving link 18 has one end thereof pivotally affixed to crank arm 17 at point 19, the other end of driving link 18 being coupled to remainder of the windshield wiper driving linkage, as described in detail hereafter.

A housing 20 (FIG. 2) is adapted to be secured to the underside of the cowl 13 of the automobile by means of suitable fastening members (not shown) secured to depending portion 21 of housing 20. A cylindrical bore 22 is provided within housing 20, and bearing members such as 23 are provided therein to support rockshaft 24 for both oscillatory and reciprocatory motion within bore 22. A windshield wiper arm 25 has the lower portion 26 thereof suitably affixed to the fluted end 27 (FIG. 4) of rockshaft 24, where it is held by catch 27'.

In order to provide oscillatory motion to rockshaft 24 and thereby motivate arm 25 and wiper 28, crankarm 29 is rigidly secured to the end of rockshaft 24 at point 30. The end of driving link 18 (FIGS. 2 and 3), which is remote from point 19, is pivotally secured to ball stud 31 which has an elongated shaft portion 32 on which a bearing bushing 33 is mounted and secured thereto as by peening the head 34 of shaft portion 32. A slot 35 is provided at the end of crankarm 29 which is remote from the point at which the latter is affixed to rockshaft 24. It can readily be seen that as driving link 18 is moved back and forth by crankarm 17, bearing 33, which is in contact with the sides of slot 35, will cause crankarm 29 to oscillate and thereby transmit this motion to the wiper 28.

Auxiliary driving arm 36 (FIGS. 2 and 3) is provided for preventing locking of driving link 18 and crankarm 29 in a dead center position in the event that wiper 28 is driven through an arc which approaches 180°. It can readily be seen from FIG. 3 that when driving link 18 and crankarm 29 are in a substantially dead center position, auxiliary driving arm 36 still remains at an angle of less than 180° to driving arm 18. As can be seen from FIG. 2 auxiliary link 36 has a lower portion thereof pivotally mounted on ball stud shaft 32. The upper end of auxiliary link 36 is pivotally mounted on reduced diameter portion 37 of pin 38. Slot 35 in crankarm 29 is dimensioned so that bearing 33 will abut the lower end thereof at the extreme limits of wiper travel.

As noted above, with windshields having portions of extreme curvature, it is necessary to slightly rotate the upper portion 39 of wiper arm 25 in order to maintain wiper 28 substantially normal to the surface of windshield 11 beyond the portions of extreme curvature. In order to accomplish this, the upper portion 39 (FIGS. 2 and 4) is adapted to swivel about the longitudinal axis of the wiper arm. In order to permit this swivelling movement, the upper portion 39 is pivotally mounted on hollow stud 45 (FIG. 4) extending from the lower portion 26 of the wiper arm. A pin 40 is retained within hollow stud 45 of wiper arm 25 by spring 41 which bears on the head 42 of pin 40, spring 41 being retained within the hollow stud 45 provided therefor by spinning the ends 43 over washer 44. In order to assemble the upper portion 39 of wiper arm 25 over the lower portion 26, the upper portion is slipped down over hollow stud 45 and C-washer 47 is slipped under enlarged head 48 of pin 40, the spring 41 thereby causing C-washer 47 which is pressed against pinhead 48 to retain upper portion 39 in engagement with lower portion 26 of wiper arm 25 while permitting the above described swivel motion.

In order to provide the swivel motion to the upper portion 39 of wiper arm 25, as required, at various points of the wiper's travel, a cam 49 is rigidly affixed to the outer portion of tubular housing 40. Extending from the upper portion 39 of wiper arm 25 is a positive cam follower arrangement 50 having depending cam follower arms 51 and 52. It can readily be seen that as the rockshaft 24 causes the wiper arm 25 to oscillate back and forth, cam followers arms 51 and 52 will ride along cam 49 and thereby cause the upper wiper arm portion 39 to swivel about pin 40 to thereby maintain wiper 28 substantially normal to windshield 11.

In order to obtain the above desired swivel movement of wiper arm with a minimum of binding it is necessary that rockshaft 24 (FIG. 2), in addition to oscillating in the above described manner, reciprocate from its solid line position to its dotted line position. In order to accommodate this required reciprocation with a minimum of lost motion in the linkage and to prevent binding between crankarm 29 and auxiliary drive link 36, the following structure is provided: Pin 38 is mounted for reciprocation in bearing 53 which is located in the hollow portion 54 of rockshaft housing 20. Crankarm 29 has an extension 55 (FIGS. 2 and 3) which is adapted to be slidably received in recessed portion 56 of pin 38. It can readily be seen, therefore, that as rockshaft 24 reciprocates from its solid line position to its dotted line position, portion 55 of crankarm 29 which is engaged in recessed portion 56 of pin 38 will cause the latter to reciprocate in synchronism with rockshaft 24. Accordingly, auxiliary driving arm 36 which is pivotally mounted to pin 38 and which cannot move axially relative thereto, moves outwardly in synchronism with rockshaft 24, crankarm 29, and pin 38. Because of the foregoing construction, parallelism is maintained between crankarm 29 and auxiliary link 36 at all portions of travel of rockshaft 24. Furthermore, since there are no relatively movable portions within rockshaft 24 there is no play which can be reflected as wiper "slap."

It can thus be seen that a windshield wiper linkage has been provided which can be used with a windshield having portions of extreme curvature in which the wiper is required to travel through an arc which approaches 180°, and in which there is a minimum amount of lost motion which causes wiper slap, and in which binding of the various critical portions of the wiper linkage is positively prevented.

While we have described a preferred embodiment of our invention, we desire it to be understood that it is not limited thereto but may be otherwise embodied within the scope of the following claims.

We claim:

1. A driving arrangement for a windshield wiper rockshaft which travels in a compound motion path including oscillation and reciprocation comprising a motor, a rockshaft, a wiper arm coupled at one end of said rockshaft, a crankarm coupled at the other end of said rockshaft, a driving link coupled at one end to said motor, means for causing said rockshaft to reciprocate in an axial direction as a result of maintaining a wiper blade substantially normal to a curved windshield, a link longer than said crankarm mounted between a connection at the other end of said driving link and a pivot offset from said rockshaft, means connecting said link and said crankarm, and means interconnecting said rockshaft and said pivot for causing said pivot to reciprocate in unison with said rockshaft whereby said crankarm and said link are maintained in a substantially constant relative orientation axially of said rockshaft during axial movement of said rockshaft.

2. A driving arrangement for a windshield wiper rockshaft which travels in a compound motion path including oscillation and reciprocation comprising a crankarm affixed to said rockshaft, a link mounted on pivot means proximate said crankarm, a driving link adapted to be driven by a motor, first connecting means pivotally coupling said driving link to said link, second means coupling said link to said crankarm, means for causing said rockshaft to reciprocate as a result of maintaining a wiper blade substantially normal to a windshield, said pivot means for said link comprising a pin mounted for reciprocation in a direction substantially parallel to the direction of reciprocation of said rockshaft, said pin being off-center from the axis of said rockshaft, said link being of greater length than the effective length of said crankarm, and means coupling said rockshaft and said pin for causing said rockshaft and said pin to reciprocate in unison whereby said crankarm and link are moved substantially in unison in the direction of the rockshaft axis during reciprocating movement of said rockshaft.

3. A driving arrangement as set forth in claim 2 wherein said last-mentioned means comprises a follower on said pin and an extension of said crankarm cooperative with said follower.

4. In a windshield wiper arrangement having a wiper mounted on a wiper arm supported on a rockshaft and a wiper motor for operating said wiper, a motion transmission system including crankarm means fixed to said rockshaft, a link mounted for pivotal movement about a pivot spaced from said rockshaft, a connection joining said crankarm means and link at the end of said crankarm remote from the connection between said crankarm and said rockshaft for permitting oscillatory movement of both said crankarm and said link, said link being of a greater length than the length of crankarm between said connection and said rockshaft, a driving link pivotally connected between second crankarm means operatively associated with said wiper motor and said link, means for causing said rockshaft to reciprocate as a result of maintaining said wiper substantially normal to a windshield, and means to permit said link to move in a direction axially of said rockshaft to accompany said reciprocation of said rockshaft for maintaining portions of said crankarm and link in substantially parallel planes during reciprocation of said rockshaft to prevent binding therebetween.

5. A driving arrangement for transmitting motion from a windshield wiper motor to a windshield wiper comprising a rockshaft, a crank arm coupled to said rockshaft, a wiper arm for mounting said wiper, said wiper arm being coupled to said rockshaft, normalizing means operatively associated with said wiper arm for causing said wiper to be normalized with respect to a windshield throughout its path of travel, said normalizing means causing said rockshaft and crank arm to move in a direction axially of said rockshaft incidental to maintaining said wiper normal to said windshield, link means driven by said motor, a link coupled at one end to said link means by means of a first connection and at the other end to a pivot spaced from said rockshaft, a second connection between said link and said crankarm, said link being of a greater length than said crankarm and being movable about said pivot, and means for preventing said crankarm and link from approaching each other in a direction axially of said rockshaft when said rockshaft and crankarm move in said axial direction.

6. A driving arrangement for a windshield wiper comprising a rockshaft adapted to oscillate and reciprocate, a crankarm affixed to said rockshaft, a first link for transmitting motion from a motor, a second link mounted at one end on a pivot spaced from said rockshaft and coupled at the other end to said crankarm, a pivotal connection between said first link and said second link, and means for preventing said second link and said crankarm from approaching each other in a direction axially of said rockshaft as said rockshaft reciprocates during operation.

7. A windshield wiping arrangement for a curved windshield comprising a wiper, a rockshaft, an arm mounted on said rockshaft for mounting said wiper, a support for mounting said rockshaft for oscillatory and reciprocatory movement, turning means associated with said wiper arm for normalizing said wiper with respect to said windshield, a motor, a first link for transmitting motion from said motor, a crank arm affixed to said rockshaft for transmitting motion to said rockshaft, a slidable pin offset from said rockshaft, a second link mounted at one end on said slidable pin and connected at the other end to said first link, a connection between said second link and said rockshaft, said second link being longer than the effective length of said crankarm, and a connection between said crankarm and said slidable pin for causing said pin to slide as said rockshaft reciprocates in response to said wiper arm being actuated by said turning means whereby interference between said crank arm and said second link is prevented.

8. A windshield wiping arrangement for a curved windshield comprising a wiper for said windshield, a rockshaft, an arm mounted on said rockshaft for mounting said wiper, a support for mounting said rockshaft for oscillatory and reciprocatory movement, turning means coupled to said wiper arm for normalizing said wiper with respect to said windshield, said mounting between said arm and rockshaft causing said rockshaft to reciprocate as said wiper is normalized, a motor, means for transmitting motion from said motor, a crankarm coupled to said rockshaft, a slidable pin spaced from the axis of said rockshaft, a link of greater length than said rockshaft mounted on said slidable pin for oscillation when said wiper is in operation, said link being operatively joined by means of a connection to said motion transmitting means and also being joined to said crankarm, and coupling means extending between said rockshaft and said slidable pin for causing said pin to slide as said rockshaft reciprocates in response to said wiper arm being actuated by said turning means whereby interference between said crankarm and said second link is prevented.

9. A driving arrangement for a windshield wiper comprising a rockshaft adapted to oscillate and reciprocate, a crankarm affixed to said rockshaft, a first link for transmitting motion from a motor, a second link mounted at one end on a pivot spaced from said rockshaft and coupled at the other end to said crankarm, a pivotal connection between said first link and said second link, and means for causing said second link, crankarm, and rockshaft to move in unison in a direction axially of the rockshaft as said rockshaft reciprocates.

References Cited in the file of this patent
UNITED STATES PATENTS

| | | |
|---|---|---|
| 1,982,624 | Barker | Dec. 4, 1934 |
| 2,298,197 | Coffey | Oct. 6, 1942 |
| 2,691,186 | Oishei et al. | Oct. 12, 1954 |
| 2,806,557 | Finkin | Sept. 17, 1957 |
| 2,895,158 | Riester | July 21, 1959 |

FOREIGN PATENTS

| | | |
|---|---|---|
| 716,825 | Germany | Jan. 30, 1942 |